United States Patent
Mackenzie

[15] 3,660,155
[45] May 2, 1972

[54] METHOD FOR PREPARING SOLID FILMS

[72] Inventor: John D. Mackenzie, Los Angeles, Calif.
[73] Assignee: The United States of America as represented by the Secretary of the Navy
[22] Filed: Apr. 15, 1970
[21] Appl. No.: 28,841

[52] U.S. Cl. ..........................117/201, 117/106 R, 117/93, 148/6.3, 204/192, 338/308, 252/518
[51] Int. Cl. ................C23c 13/00, C23c 15/00, C23f 17/00, C23b 5/50
[58] Field of Search .....................117/201, 106, 93; 148/6.3; 204/192; 338/308; 452/518

[56] References Cited

UNITED STATES PATENTS 3,483,110   12/1969   Rozgonyi.............................204/192
3,491,000   1/1970   Fuls et al. ..............................148/6.3

Primary Examiner—William L. Jarvis
Attorney—R. S. Sciascia and L. I. Shrago

[57] ABSTRACT

The electrical discontinuity which appears in the temperature response of certain materials when they are in crystalline form and are at characteristic transitional temperatures is suppressed by depositing the material on a substrate which is maintained at a temperature low enough to cause the resulting film to be amorphous. Also, by utilizing temperatures on either side of the transitional temperature, for example, new and different resistivity versus temperature responses may be realized which do not inhibit the semiconductor-metal transition.

4 Claims, 3 Drawing Figures

METHOD FOR PREPARING SOLID FILMS

The invention described herein may be manufactured and used by or for the Government of the United States of America for governmental purposes without the payment of any royalties thereon or therefor.

The present invention relates generally to methods for controlling the electronic properties of solid films and, more particularly, to a technique which produces noncrystalline films which are electrically conductive and which do not undergo structural transitions or exhibit abrupt changes in their electronic properties when subjected to temperature excursions through the material's crystalline transition temperatures.

It is well known that crystalline solids often undergo structural transitions at specific temperatures. At these so-called transition temperatures, certain properties of the crystal may experience large variations. For example, the two lower oxides of vanadium $V_2O_3$ and $V_2O_4$ each exhibit a large and discontinuous change in electrical resistivity at $-120°$ C. and $66°$ C., respectively.

These semiconductor-metal transitions are the result of crystallographic transformations. For example, for $V_2O_3$ the room temperature phase is hexagonal, whereas the structure of the low temperature material is monoclinic. At the transitional temperature, the resistivity changes by some six orders of magnitude. For $V_2O_4$ the high temperature phase has a tetragonal rutile structure, while the low temperature form is also monoclinic. The resistivity of this material changes by four orders of magnitude at the transitional temperature. Numerous theories have been postulated to account for this large variation of resistivity at the transitional temperature, but an unambiguous explanation is still lacking.

Applicant has discovered that the large and discontinuous changes in electrical resistivity associated with crystallographic transformations may be avoided by preparing the solid films in amorphous form. He has found that the electronic properties of the amorphous composition may be selectively "frozen in." More specifically, he has ascertained that the electrical resistivity of the amorphous film may be made to correspond to either the crystalline phase of the same material which is stable above its transitional temperature or to the crystalline phase which is stable below this temperature. What this means is that electrically conducting amorphous films having the same chemical composition may be selectively prepared having different resistivity versus temperature responses. One film, for example in the case of $V_2O_4$, will have its resistivity range bounded by the nominal values of the resistivity at one end of the crystalline discontinuity and therefore have a lower resistivity over a new range of temperature values. The other film will have its resistivity range bounded by the nominal values of the resistivity at the other end of the crystal discontinuity and thereby have a higher resistivity over a new temperature range. Both resistivity curves for this material will be linear, substantially parallel and separated by approximately four orders of magnitude of resistivity.

These noncrystalline, electrically conductive films may be advantageously employed as resistors, conductors, or otherwise used in the fabrication of electronic components or subassemblies in a wide variety of electrical circuits for solid-state devices.

It is accordingly a primary object of the present invention to provide a method for controlling the electronic property of solid films.

Another object of the present invention is to provide a method for preparing non-crystalline films which are electrically conductive.

Another object of the present invention is to provide solid films which do not exhibit the semiconductor-metal transition and the electrical resistivity changes associated therewith.

Another object of the present invention is to provide amorphous films of metallic oxides which have preselected electrical resistivity characteristics.

Another object of the present invention is to provide a technique for preparing amorphous films of metallic oxides whose electric resistivities may be similar to the crystalline phase of the material at certain temperature ranges which may be above or below their transitional temperatures.

Another object of the present invention is to provide a method for preparing noncrystalline, electrically conductive films utilizing an R.F. sputtering process in which the substrate temperature is controlled and maintained either above or below the transitional temperature of the same crystalline material.

Other objects, advantages and novel features of the invention will become apparent from the following detailed description of the invention when considered in conjunction with the accompanying drawings wherein.

If a solid film is made by the deposition of vapor on a solid substrate, there is a natural tendency for the atoms or ions or complex species to assume a structure which is of the lowest free energy. This normally will be the particular crystal structure which happens to be thermodynamically stable at the "apparent" temperature of the substrate. The higher the temperature of the substrate, the higher will be the tendency for a crystalline film to form. However, when the substrate is cold, then the film may be amorphous. Thus, by controlling the substrate temperature, as is well known, most films can be prepared in the amorphous state. A structure will be considered amorphous in the present disclosure if an X-ray diffraction shows it to have no well defined peaks or rings.

Figure 1:
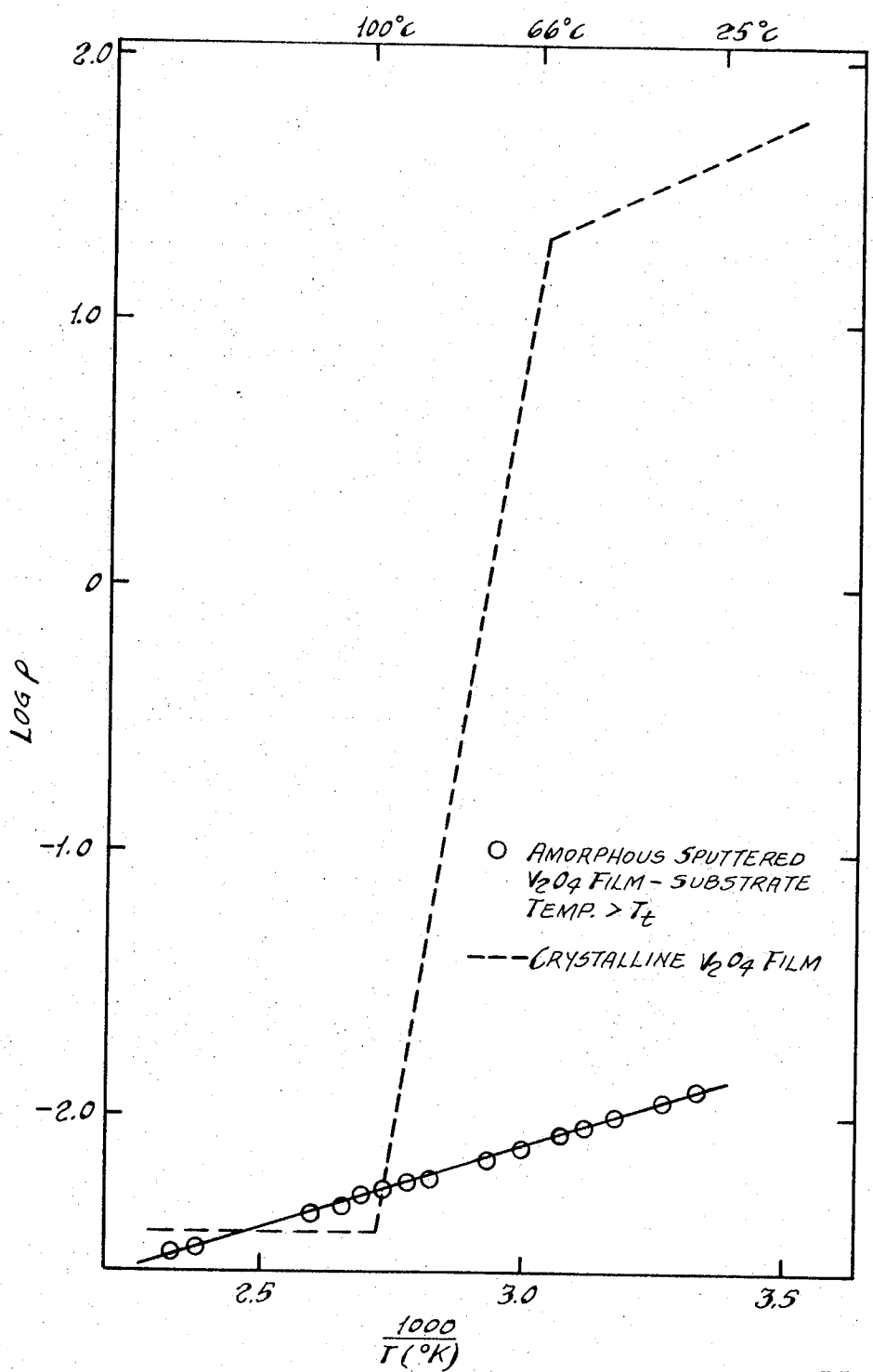
FIG. 1 is a plot of log resistivity versus reciprocal temperature for crystalline and amorphous $V_2O_4$ deposited at a temperature greater than the transitional temperature.

Referring now to FIG. 1 of the drawings which is a plot of log resistivity versus reciprocal temperature for $V_2O_4$, it will be seen that the material when in crystalline form, as represented by the dash line, shows a large discontinuity at approximately 66° C. At temperatures above this value, the resistivity is about $10^{-2}$ ohm cm. At temperatures below this value, the resistivity is slightly over $10^{-1}$ ohms per cm. Thus, as the material is exposed to a temperature excursion through this transitional temperature, its resistivity changes by approximately three orders of magnitude.

As previously mentioned, applicant has discovered that if the "apparent" substrate temperature in the film forming process is above the transitional temperature, in this case 66° C., the amorphous film which is formed will resemble the crystalline phase which is stable at temperatures above this transitional temperature. Alternatively, when the substrate temperature is maintained at a value less than its transitional temperature during the process, the amorphous film will resemble the crystalline phase which is stable at temperatures below this transitional temperature.

The resistivity properties of the amorphous film thus can be selectively "frozen in" or "preserved" by merely controlling the temperature of the substrate. This phenomenon may be seen by again referring to FIG. 1 and considering the solid line at the bottom of the plot which depicts the resistivity of an amorphous film of $V_2O_4$ prepared on a substrate held at a temperature greater than 66° C. This curve does not contain any discontinuity as it passes through the 66° temperature to a lower temperature range. It still possesses a resistivity, three orders of magnitude lower than the crystalline material at the same temperature. Hence, the resistivity of the amorphous film corresponds more closely to that of the high temperature crystalline phase although its temperature coefficient is not metallic.

Figure 2:
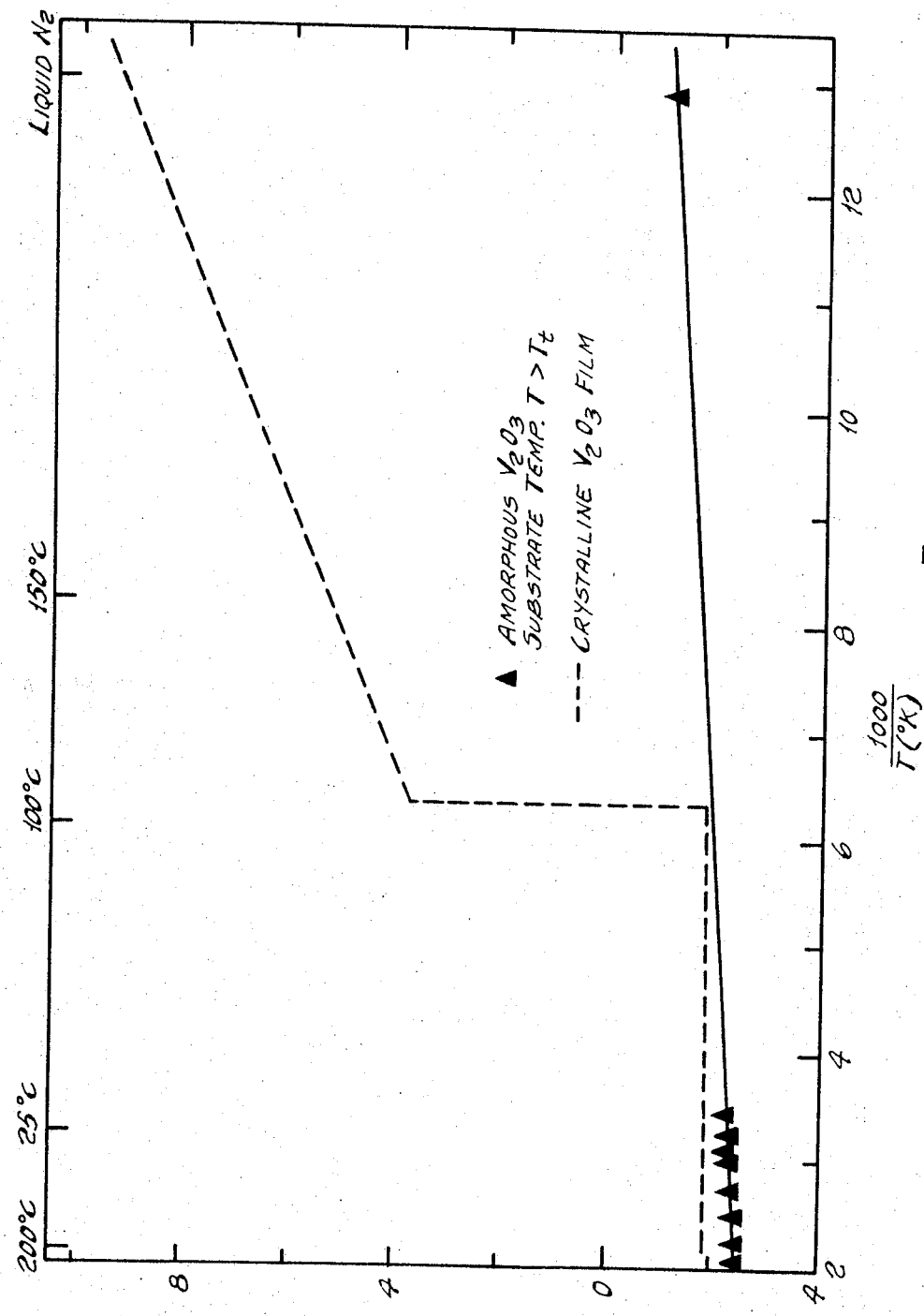
FIG. 2 is a plot of the log resistivity versus reciprocal temperature for crystalline and amorphous $V_2O_3$ deposited at a temperature greater than the transitional temperature.

In FIG. 2 the resistivity of an amorphous film of $V_2O_3$ on a fused silica substrate is compared to that of a corresponding crystal. Here, too, the substrate temperature was maintained at a value greater than the transitional value $-120°$ C. Again, the observed results correspond more closely to the high temperature phase of crystalline $V_2O_3$. The semiconductor-metal transition is absent and, at temperatures below $-120°$ C., the relatively low resistivity of the amorphous film is observed in a new temperature range and is some five orders of magnitude less than that of the crystal.

While the resistivity of both amorphous $V_2O_3$ and $V_2O_4$ films may vary somewhat with the nature of the substrate, they all correspond closely to the resistivity of the high temperature phases of the respective crystals. None exhibits the semiconductor-metal transition. In the above case, the amorphous films were both made by radio frequency sputtering of the crystalline oxides onto substrates held at temperatures above 135° C., that is, above their respective transitional temperatures. It will be appreciated that applicant has thus prepared two amorphous films with resistivities many orders of magnitude lower than those of the crystalline phases. The temperature coefficient of resistivity of these films is, however, not metallic.

Figure 3:
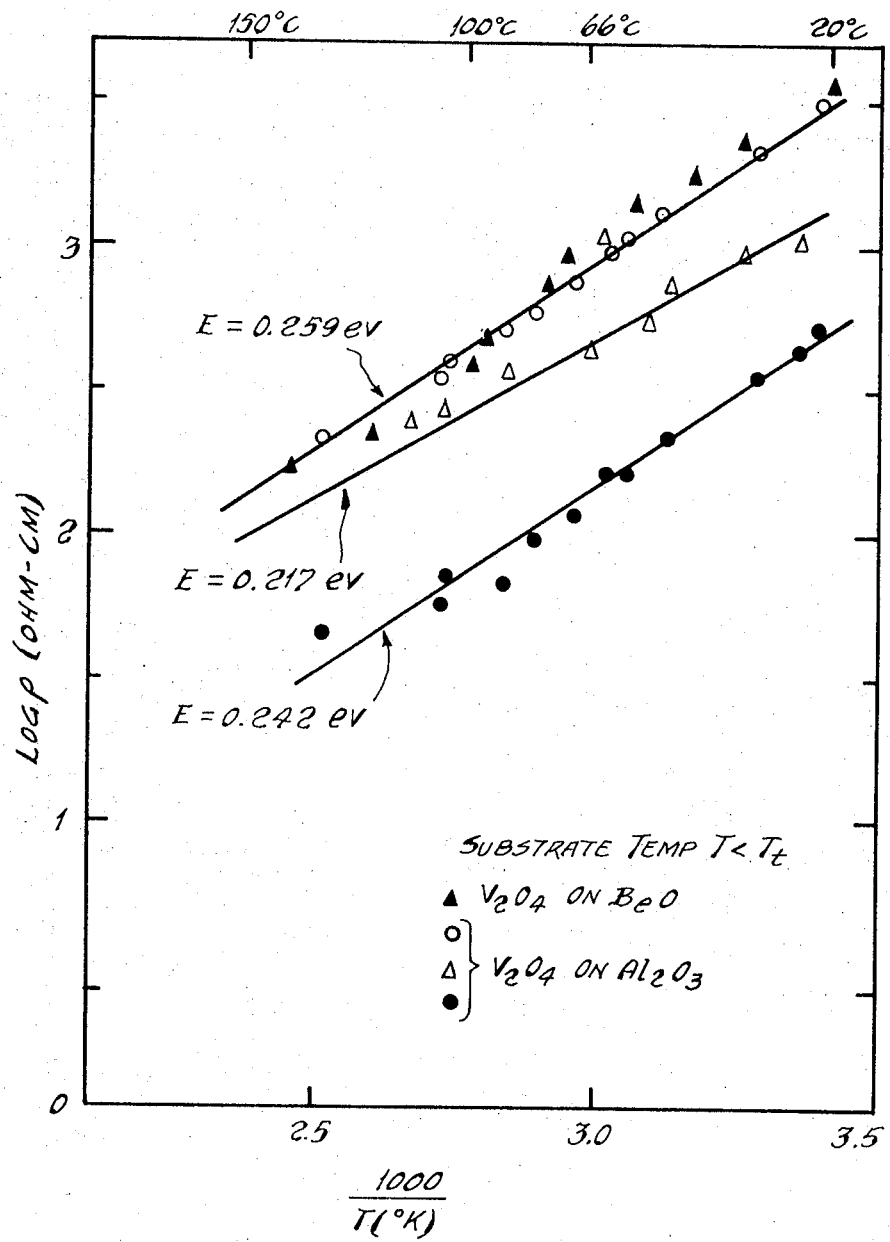
FIG. 3 is a plot of the log resistivity versus reciprocal temperature for crystalline and amorphous $V_2O_4$ deposited at temperatures less than the transitional temperature.

Up to this point, the disclosure has dealt with the cases where the substrate temperature was maintained at a level higher than the transitional temperature. The alternative situation where the substrate temperature is kept below the transitional temperature is depicted in FIG. 3 and the material is $V_2O_4$. This figure shows the resistivity of such an amorphous film on different substrates, such as BeO and $Al_2O_3$ produced by an R.F. sputtering process at different electron voltage conditions.

Examining this figure, it will be seen that all three films have relatively high resistivities ranging from approximately $10^2$ ohms cm. to $10^3$ ohms cm. as compared to the $10^2$ value of the amorphous film shown in FIG. 1. Thus, by lowering the substrate temperature below the 66° value, applicant has now formed high resistivity films which correspond in general to the low temperature, semiconductor crystalline phase of $V_2O_4$. Again, there is no discontinuity at the transition temperatures and the resistivity performance of the materials are fixed.

The amorphous films described above were prepared as follows:

Powdered oxides of $V_2O_3$ and $V_2O_4$ of high purity were painted as a paste on a metal sputtering target after mixing in a solution of ethylcellulose in diethylene glycol. The coated target was dried and cured in air at 123° C. for about 3 hours and then connected to the electrode of a Lepel radio-frequency sputtering system. The resulting oxide target prepared in this manner contained about 3 w/o ethylcellulose. Substrates used included single crystals MgO, $Al_2O_3$ and $SiO_2$, polycrystalline $Al_2O_3$, and silica glass. The substrates were ultrasonically cleaned in trichloroethylene for 20 minutes prior to placement on a brass platform in the vacuum chamber. The system was evacuated to $10^{-6}$ torr and argon admitted. Sputtering was conducted at a frequency of 14 MHz. and a dynamic argon pressure of about $10^{-2}$ torr. The deposition rates were approximately 1,000 A. per hour. Films of 5,000 A. to 6,000 A. were prepared this way and their properties measured.

It would also be pointed out that while the electronic properties of the amorphous films may be preserved, this preservation will not endure if the amorphous films are subjected to temperatures which will cause their recrystallization. In the case of the vanadium oxides previously described, this temperature is approximately 400° C. and may be readily determined for other materials.

Other oxides which exhibit the resistivity discontinuities are the titanium oxides, and amorphous films made of these materials may be fabricated according to applicant's method for the purposes previously described. Some sulfides, especially the rare earth sulfides, also show this transformation and may be processed according to this invention. It is furthermore believed that the application of the present invention may be extended to other electronic phenomenon besides resistivity, such as ferro-electricity and ferromagnetism, providing that at the transition temperature, even a small variation of the crystal structure must occur.

It would be pointed out that the present invention applies to all substrate materials and is not confined to those specifically enumerated above and that the modified electrical characteristics of the materials involved depend essentially on the temperature at which these substrates are maintained during the process. Likewise, the invention is not confined to the R.F. sputtering method, per se, since all other vapor deposition techniques may be employed, such as, reactive sputtering, D.C. sputtering, evaporation by heat, by electron beam, by laser beam, and chemical vapor deposition.

What is claimed is:

1. In a method for imparting either of two distinct resistivity versus temperature responses to a solid film made of a material which in its crystalline form exhibits portions of each of these two distinct temperature responses over different temperature ranges which are on either side of a characteristic transitional temperature at which a resistivity discontinuity occurs, the step of vapor depositing said material on a substrate while maintaining the temperature of said substrate either above or below said transitional temperature, depending upon which of said two distinct resistivity versus temperature responses are desired, the selected temperature also being sufficiently low so as to cause the resulting film to have amorphous properties.

2. In a method as defined in claim 1, wherein said material is $V_2O_4$ and the transitional temperature is approximately 66° C.

3. In a method as defined in claim 1, wherein said material is $V_2O_3$ and the transitional temperature is approximately $-120°$ C.

4. A solid amorphous film of $V_2O_4$ prepared by vapor depositing said $V_2O_4$ on a substrate maintained at a temperature below approximately 66° C. during the film forming process whereby the resistivity versus temperature response of said amorphous film is linear over a temperature range which includes the crystalline transitional temperature of $V_2O_4$.

* * * * *